United States Patent [19]

Fields et al.

[11] 4,106,917

[45] Aug. 15, 1978

[54] GAS PREPARATION

[75] Inventors: Marvin C. Fields, Wilkins Township, Allegheny County; David L. Oliver, North Huntingdon Township, Westmoreland County; Arthur R. Snyder, Franklin Borough, all of Pa.

[73] Assignee: United States Steel Corporation, Pittsburgh, Pa.

[21] Appl. No.: 767,916

[22] Filed: Feb. 11, 1977

[51] Int. Cl.² ............................................. B01D 53/14
[52] U.S. Cl. .......................................... 55/31; 55/32; 55/64; 55/70; 55/73; 423/246
[58] Field of Search ................... 55/29, 30, 31, 32, 63, 55/64, 65, 70, 73; 423/246

[56] References Cited

U.S. PATENT DOCUMENTS

| 2,301,779 | 11/1942 | Herold et al. ......................... 55/73 X |
| 2,871,979 | 2/1959 | Scofield .................................... 55/32 |
| 2,993,566 | 7/1961 | Griffin ...................................... 55/31 |
| 3,324,627 | 6/1967 | Kohrt ....................................... 55/32 |
| 3,383,838 | 5/1968 | Carson ................................. 55/73 X |
| 3,831,348 | 8/1974 | Pap ........................................ 55/73 |
| 3,880,617 | 4/1975 | Shibuya et al. ...................... 55/73 X |
| 3,923,958 | 12/1975 | Turnbo et al. ................... 423/246 X |
| 3,948,621 | 4/1976 | Cocuzza et al. ........................ 55/29 |
| 3,975,172 | 8/1976 | Ranke .................................. 55/73 X |

FOREIGN PATENT DOCUMENTS

| 562,184 | 11/1957 | Belgium ................................. 55/31 |
| 658,499 | 2/1963 | Canada .................................. 55/29 |

Primary Examiner—Charles N. Hart
Assistant Examiner—Robert H. Spitzer
Attorney, Agent, or Firm—William L. Krayer

[57] ABSTRACT

Gas stream mixtures including ethylene, acetylene, CO, $CO_2$, water, alcohols, $H_2S$, propylene and heavier hydrocarbons, $CS_2$, etc., are prepared for further treatment by removing the water, alcohols, $CS_2$, $H_2S$, propylene and heavier hydrocarbons in separate solvent-absorption systems. In particular, coke oven gas is treated to remove water, $CS_2$, $H_2S$, propylene and heavier hydrocarbons prior to contacting it with cuprous aluminum halide to effect removal by complexing of ethylene, acetylene and/or carbon monoxide; off-gas from the complexing ligand zone or elsewhere may be used to prestrip and/or regenerate the solvent in the absorption system. Very little energy is consumed, extraction efficiencies are very high, and fouling is avoided.

13 Claims, 1 Drawing Figure

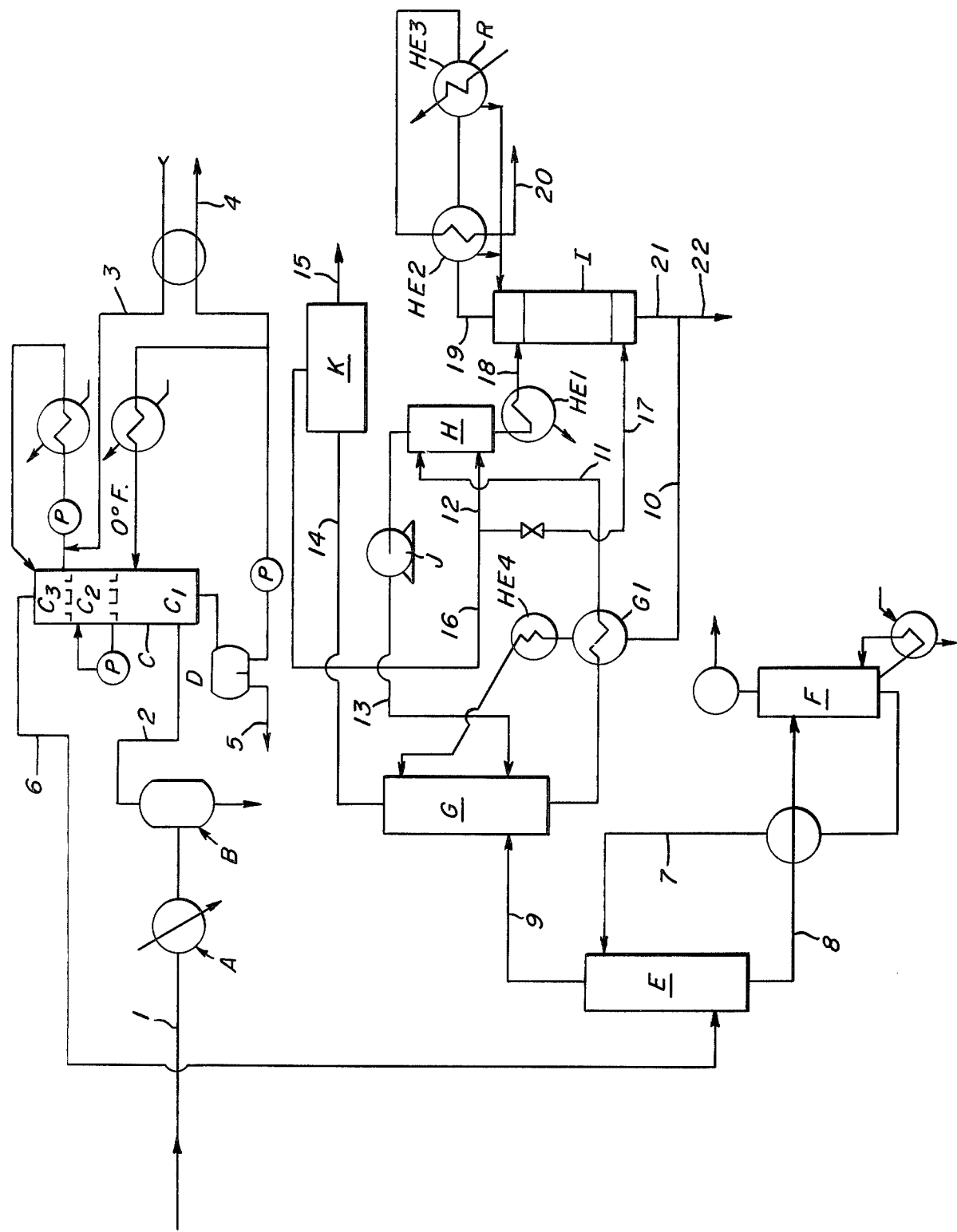

GAS PREPARATION

BACKGROUND OF THE INVENTION

Certain complexing agents may be used to remove carbon monoxide, ethylene, and/or acetylene from gas mixtures by methods disclosed, for example, in U.S. Pat. Nos. 3,592,865; 3,651,159; 3,754,047; 3,755,487; 3,758,606; 3,758,607; 3,845,188; and 3,857,869.

The methods disclosed in these patents generally employ sorbents of the formula $CuAlX_4$, where X is a chlorine, fluorine or bromine atom, in a $C_6-C_{20}$ aromatic solvent. The sorbent is able to form complexes with CO, ethylene, and acetylene, which complexes may be treated to release the gases complexed separately from the remainder of the original gas mixture, and the sorbent regenerated.

It has been observed that in a gas mixture of the type described above the cuprous aluminum halide sorbent will absorb the ethylene in preference to the carbon monoxide. However, the stream should be free of water, methanol, $CS_2$, and $H_2S$ since they react with the sorbent; propylene and heavier unsaturated hydrocarbons are complexible and may interfere with a desired process of ethylene, carbon monoxide, or acetylene removal. Accordingly, such compounds as water, methanol, $CS_2$, $H_2S$, and unsaturated hydrocarbons above ethylene should be removed before passing the mixture to the complexing solution where ethylene, carbon monoxide, or acetylene is to be recovered preferentially.

Prior to the present invention, it was known to use the liquid sorbent itself (U.S. Pat. Nos. 3,960,910 and 3,927,176) to remove the impurities. It has also been common, of course, to remove various impurities from gases by other means.

Processes which might remove water, methanol, carbon disulfide, hydrogen sulfide, propylene, and heavier unsaturated hydrocarbons from a gas containing ethylene, acetylene, and/or carbon monoxide can be grouped into two categories — fixed-bed adsorption systems and solvent-absorption systems.

A typical fixed-bed adsorption system contains two adsorbent beds in parallel. At any given time, one bed is on-stream and the other undergoing regeneration. At regular intervals (before the on-stream unit becomes saturated with contaminants), the roles of the beds are reversed. Steam or hot gas is used for regeneration. Disadvantages associated with the use of adsorption processes for the above separation are (1) complex and expensive control systems would be required for their operation; (2) an excessive amount of energy would be consumed for regeneration of the beds; (3) at the temperatures encountered in regeneration, polymerization of unsaturates adsorbed on the beds would occur; and (4) a substantial amount of ethylene and acetylene would be co-adsorbed with the contaminants and would subsequently be lost during regeneration.

Solvent-absorption systems typically contain two columns — an absorber and a stripper. The unit is operated continuously and control is relatively simple. Lean solvent entering the top of the absorber descends countercurrently to the gas flow and absorbs the contaminants from the gas. The solution is heated and enters the stripping column, where the solvent is regenerated by boiling off the absorbed contaminants. A considerable amount of the product gas may be co-absorbed with the contaminants, but its loss can be avoided by flashing or prestripping the rich solvent and recycling the vapor formed to the absorber feed. However, for the separation described above, polymerization of unsaturated compounds could occur in the stripper and would rapidly foul its reboiler and trays.

Various other methods of removing certain components for gas mixtures are also known. However, it is believed that no one has assembled the series of units and steps which we employ; no one has prepared a gas derived from coke oven gas for ethylene removal by cuprous aluminum halide absorbent solutions.

SUMMARY OF THE INVENTION

This invention relates to the purification of a gas stream in which certain complexible ligands are separated and recovered. More particularly, it relates to the removal of water, methanol, carbon disulfide, hydrogen sulfide, propylene, and heavier unsaturated hydrocarbons from a gas stream prior to the separation and recovery of ethylene, acetylene or carbon monoxide, when the separation and recovery of these gases is accomplished by contacting the gas stream with a sorbent consisting of cuprous aluminum halide in an aromatic solution and by subsequently desorbing the complexed ligands from that solution.

If a gas stream containing water, methanol, carbon disulfide and/or hydrogen sulfide is contacted with an aromatic solution of cuprous aluminum halide, these compounds react with the cuprous aluminum halide, resulting in deterioration of the absorbent solution, which is obviously detrimental. Propylene and heavier unsaturated hydrocarbons are complexible ligands and can be separated from a gas stream by contacting the gas with an aromatic solution of cuprous aluminum halide. However, cuprous aluminum halides dissociate and catalyze the reaction of these ligands with the aromatic solvent. The reaction products cause fouling and separation problems throughout a complexible ligand separation and recovery system.

This invention contemplates solvent-absorption systems which separate water, methanol, carbon disulfide, hydrogen sulfide, propylene, and heavier unsaturated hydrocarbons from a gas containing ethylene, acetylene, and/or carbon monoxide. It successfully avoids the above-enumerated problems associated with conventional solvent regeneration techniques and effectively integrates with the ligand separation and recovery unit.

If coke oven gas or some other gas mixture containing water is to be treated, it should be cooled first to a point above the freezing point of water but low enough to condense a substantial portion of water present.

In the first absorption system, the gas enters a multizone alcohol or glycol wash which further cools the gas and removes water. Use of multiple zones is preferred (but not essential) because it considerably reduces solvent consumption, so that the spent solvent can be discarded or incinerated rather than regenerated if desired. In a second absorption system, the gas is scrubbed by a small stream of aromatic solvent to remove methanol, carbon disulfide, and $C_5$ and heavier hydrocarbons. The solvent may be regenerated in a conventional stripping column. The gas is then contacted with a larger stream of liquid aromatic solvent in a third absorption system, which removes hydrogen sulfide, propylene, and less volatile hydrocarbons from the gas. Part of the off-gas from the ligand separation and recovery unit or other extraction unit may be used to prestrip the rich solvent.

Vapor from the prestripper is preferably recycled to the absorber feed so that none of the co-absorbed ethylene, acetylene or carbon monoxide is lost during stripping. High stripper temperatures may be avoided by using the remainder of the off-gas from the ligand separation and recovery system, or other extraction unit rather than heat, to regenerate the solvent. The second and third absorption systems may be combined; in any event the same solvent may be advantageously used in both. However, we prefer to use two separate systems for coke oven gas, the first being somewhat smaller than the second so that it can be conveniently cleaned.

The following are advantages of this process over fixed-bed adsorption processes and conventional absorption systems: (1) losses of ethylene, acetylene or carbon monoxide are nil; (2) all processing is continuous and can be controlled easily; (3) the process may be integrated with a complexible ligand separation and recovery unit; (4) problems caused by the polymerization of unsaturated hydrocarbons are minimal; and (5) energy consumption, particularly of steam, is low.

Our invention will be discussed in more detail with reference to FIG. 1, which is a more or less diagrammatic representation thereof.

In FIG. 1, as an example, ethylene and acetylene are to be simultaneously recovered from a coke-oven gas stream by ligand absorption. The main constituents of the gas in line 1 are hydrogen, ethylene, carbon dioxide, and methane. Also present are significant amounts of ethane, nitrogen, carbon monoxide, propylene, and acetylene. A typical composition (dry basis) of a sublimation stream from a cryogenic concentration unit operating on coke oven gas is shown below:

| Component | Flow, lb moles/hr | Flow, lb/hr |
|---|---|---|
| Argon | 4.76 | 190.1 |
| Hydrogen | 1,079.00 | 2,175.3 |
| Nitrogen | 244.02 | 6,837.4 |
| Carbon Monoxide | 156.02 | 4,370.1 |
| Oxygen | 31.68 | 1,013.8 |
| Carbon Dioxide | 638.46 | 28,098.6 |
| Carbonyl Sulfide | 2.38 | 143.0 |
| Carbon Disulfide | 3.96 | 301.5 |
| Hydrogen Sulfide | 11.88 | 404.9 |
| Methane | 646.44 | 10,368.9 |
| Ethane | 232.02 | 6,976.8 |
| Ethylene | 774.36 | 21,720.8 |
| Acetylene | 39.60 | 1,031.2 |
| Propane | 6.36 | 280.4 |
| Propylene | 51.48 | 2,166.3 |
| Propadiene | 3.96 | 158.6 |
| Butane | 2.38 | 138.3 |
| 1-Butene | 2.38 | 133.5 |
| 1,3-Butadiene | 9.98 | 539.8 |
| 2-Methyl, 1,3-Butadiene | 0.98 | 66.7 |
| Cyclopentadiene | 3.96 | 261.8 |
| Benzene | 9.98 | 779.5 |
| Toluene | 3.96 | 364.8 |
| Total | 3,960.00 | 88,522.1 |

The total gas flow is 36 MM scfd, and it is saturated with water at 100° F and 70 psia.

While we may treat many mixtures of gases by our invention, we prefer that if it contains ammonia, the ammonia should be removed prior to the first step, although the first step could include conventional means for accomplishing its removal. Coke oven gas should be treated at least to remove tars and ammonia. The incoming gas 1 is cooled to 40° F in the refrigerated cooler A. Most (881 lb/hr) of the water in the gas condenses and is removed in separator B, leaving 128 lb/hr of water in the gas in line 2. The gas enters the methanol wash column C, in which all but 1 lb/hr of the water in the gas is removed and the gas is cooled to −20° F.

Column C contains three zones. In the first, C1, a 40 percent methanol solution is circulated; in the second, C2, a 75 percent methanol solution is circulated; and in the third, C3, a 93 percent solution is circulated. The liquid circulated in the first and third zones is cooled to 0° and −20° F, respectively. About 225 lb/hr of fresh methanol from line 3 is added to the zone C3; spent methanol in line 4 containing 127 lb/hr of water and 85 lb/hr of methanol is withdrawn from the zone C1. The remaining 140 lb/hr of methanol leaves the system in the dry gas line 6. Some aromatics condense in the column and are separated from the 40 percent methanol solution in decanter D. The aromatic stream 5 contains 510 lb/hr of benzene and 333 lb/hr of toluene.

In the first aromatic scrubber or heavy-ends absorber E, the dry gas from line 6 is contacted with a relatively small (14 gpm) stream of toluene at −18° F, whereby methanol, carbon disulfide, and $C_5$ and heavier hydrocarbons are removed from the gas. The rich toluene solution in line 8 is heated by interchange with the regenerated toluene from line 7 and regenerated in the conventional stripping column F. A parallel spare (not shown) may be provided for column F so that it can be cleaned periodically. The gas leaving the heavy-ends absorber E is saturated with toluene (33 lb/hr), but otherwise contains no significant amounts of compounds less volatile than butane.

The gas flows through line 9 from the heavy-ends absorber E into propylene-butadiene absorber G. It is contacted in absorber G with a 700 gpm stream of toluene from line 10 at −30° F. Nearly all (98.7%) of the propylene and $H_2S$ and essentially all (>99.98%) the propadiene, butene, and 1,3-butadiene are absorbed. Also, much of the residual water will be absorbed. The rich toluene solution in line 11 from the absorber also contains 2,825 lb/hr of ethylene and 385 lb/hr of acetylene.

The rich toluene in line 11 is heated in G1 to 55° F before it enters the prestripper H, where a small part (i.e., from 5 to 10%) of the off-gas in line 16 from the complexible ligand separation and recovery system K, containing a cuprous aluminum halide sorbent, strips 2,805 lb/hr of ethylene and 320 lb/hr of acetylene from the toluene. Prestripper H is operated at 55 psia and a small compressor J recycles the overhead vapor from prestripper H through line 13 to the intake of absorber G. The net losses of ethylene and acetylene in the prestripped toluene line 18 are small, namely, 20 and 65 lb/hr, respectively.

The gas in line 14 leaving absorber G after it is heated can be used as feed for a complexible ligand separation and recovery unit K. The sorbent, a solution of cuprous aluminum halide in toluene, is used to selectively absorb ethylene and acetylene from the gas in a known manner. The system K is operated so that carbon monoxide remains in the off-gas from the absorber. The unit recovers 22,667 lb/hr of high-purity ethylene and acetylene product collected through line 15.

The off-gas in line 16 from the complexible ligand absorber K contains virtually no ethylene, acetylene, or $C_3$ and $C_4$ hydrocarbons, and can be used to both prestrip and regenerate the toluene from the propylene-butadiene absorption system in unit I. Seven percent of the gas (stream 12) is used for prestripping; the remainder (stream 17) is used for regeneration. The prestripped toluene is heated to 130° F in heat exchanger HE1 before entering the stripper I. The off-gas in line 17 at 40 psia regenerates the toluene. The overhead line 19 from the stripper is cooled to −20° F by interchange and refrigeration in heat exchangers HE2 and HE3 to condense toluene, so that only 138 lb/hr are lost in the fuel gas 20. More toluene enters propylene-butadiene removal system I in the off-gas 16 than leaves. Accumulation of toluene in the system is avoided by recycling 2,760 lb/hr (stream 22) of the stripped toluene 21 to the ethylene-acetylene separation and recovery unit K by means not shown. The remaining 304,000 lb/hr of regenerated toluene, stream 10, is cooled by interchange and refrigeration to −30° F in heat exchangers G1 and HE4 before it enters absorber G.

Circulation rates in the methanol wash and methods of heating and cooling may be varied as circumstances demand.

The pressure of the imcoming gas 1 and throughout the system except where specifically discussed may vary significantly, i.e., between 0.1 and 1000 psia, but is preferably between 20 and 100 psia. Cooling in unit A should be such as to condense substantial proportions of the water present, but not to freeze it, preferably to just above the freezing point of water. The gas leaving unit C may be at a temperature between −140° and 250° F, preferably between −50° and −10° F. The residual amount of water remaining in the gas varies with the temperature of the top zone and with the number of zones. There may be any number of zones in unit C, but the (preferred) number is three to six. Most of the water is removed in the first zone C1, in which a relatively dilute (20 to 80% solvent) solution is circulated. The solution circulated in each succeeding zone is richer in solvent than that in the zone below. Because the net amount of solvent used may be small, solvent may be recirculated within each zone to obtain good gas-liquid contact. Fresh solvent is added to the upper zone; the net amount of spent solvent is withdrawn from the bottom zone, and may be discarded or incinerated. Heat transferred to the solvent from the gas in absorber C may be removed in one or more of the zones by refrigeration or interchange. Hydrocarbons may condense and form a second liquid phase in the bottom zone; they may be decanted from the aqueous solution.

Methanol, carbon disulfide, and $C_5$ and heavier hydrocarbons are separated from the gas in unit E before the propylene absorption system because otherwise they would tend to accumulate in that system. A relatively small stream of aromatic solvent (5 to 100 gpm, preferably 10 to 25 gpm) at a temperature above its freezing point and less than 250° F, preferably between −50° and −10° F, is contacted with the gas in unit E and is regenerated in a conventional stripping column F which may or may not be operated under vacuum. The stripping column F and its reboiler are small, and replacements may be provided so that they could be cleaned whenever severe fouling occurs. Fouling may be reduced by vacuum operation of the column or by addition of a non-volatile polymerization inhibitor to the solvent.

We may use any solvent for propylene or other material to be removed (i.e. solvents for $H_2S$, butadiene, etc.) which does not freeze at operating temperatures. Among the solvents which may be used in absorbers E and G are toluene, ethylbenzene, and cumene. Preferably the solvent in units E and G is toluene, although xylene, ethylbenzene, and cumene may be equally useful. When toluene is used, temperatures may range from about −140° to 250° F.

From the heavy-ends absorber E the gas goes into the main absorption unit G where hydrogen sulfide, propylene, and less volatile hydrocarbons are removed. The solvent, at a temperature above its freezing point and between −140° and 250° F, preferably between −40° and −10° F, absorbs nearly all the hydrogen sulfide and $C_3$ and $C_4$ hydrocarbons, and a substantial amount of ethylene, acetylene, and/or carbon monoxide.

The operation of the absorber K and the associated desorption equipment can be modified in a known manner so that ethylene, acetylene, carbon monoxide, or some combination of these ligands is separated and recovered. A small part (typically 1 to 20%) of the off-gas from the absorber K is used to prestrip (in unit H) the solvent from the propylene absorption system; the prestripped solvent is subsequently stripped by the remainder of the off-gas. The solvent leaving the absorber G is heated to −100° to 350° F, preferably between 30° and 100° F. It enters a prestripper H at this temperature (in the example at 55° F) where off-gas from the complexible ligand separation and recovery system strips recoverable ligands which were co-absorbed with the hydrogen sulfide, $C_3$'s and $C_4$'s. Vapor from the prestripper H is recycled to the absorber feed so that only a small net loss of recoverable ligands occurs. The amount of off-gas used in the prestripper H is preferably enough to effectively strip the co-absorbed ligands, while not causing excessive recycle of hydrogen sulfide or $C_3$ hydrocarbons. The prestripper H is advantageously operated at a lower temperature than the main stripper, when ethylene or acetylene is to be recovered, to take advantage of increased separability at lower temperatures.

The solvent leaving the prestripper H is heated (in HE1) to a temperature between −50° and 400° F, preferably between 110° and 170° F, before it enters the stripper I. Use of $C_3$–$C_4$-free off-gas for stripping and operation at reduced pressure with relation to the absorber pressure makes complete regeneration of the solvent possible at low temperatures, so that little or no fouling occurs. Solvent in the gas leaving stripper I is recovered by cooling and refrigerating the gas in HE2 and HE3. The regenerated solvent is cooled by interchange and refrigeration at G1 and HE4 before it returns to the absorber.

Wherever we use the term "off-gas", we mean, (1) typically, the gas which has passed through a complexible ligand separation and recovery system such as the cuprous aluminum halide systems discussed above, which is normally dicarded or burned after removal of CO, ethylene and/or acetylene, (2) any gas substantially free of ethylene and less volatile compounds, or (3) any gas not containing ethylene, acetylene, or carbon monoxide, i.e., the gas or gases to be recovered, and which will not substantially dissolve in the toluene or other medium used in the stripper. That is, where ethylene is to be recovered, the off-gas or other gas used in the prestripper and/or stripper should not contain ethylene, but may contain CO.

There are several modifications to the invention described above which may also be used. For example, the gas while is to be purified need not contain all the contaminants mentioned. The complexible ligands which are separated and recovered may be carbon monoxide, acetylene, or ethylene, or any combination of them. Ligand complexing agents other than cuprous aluminum halide may be employed, e.g., cuprous boron halides or silver aluminum halides. If the gas were dry, the water removal system would be unnecessary. If high product yields were not needed, a prestripper would not be required. This is so whether the ultimate objectives to recover CO, ethylene, or other gases.

The solvents in the absorption systems need not be those specifically mentioned above. Any solvent that does not react with a gas component, is miscible with water and has a low freezing point, may be used in place of the methanol wash. For example, ethylene glycol or propylene glycol may be used. The solvents used in the second and third absorption systems need not be aromatic compounds. Any liquid hydrocarbon with a low melting point may be used as a solvent. While the second and third absorption systems preferably employ the same solvent, they need not be separate at all; the second, however, may advantageously be smaller than the third and operated on a schedule to permit occasional cleaning if necessary. The ligand separation and recovery system may be modified to include a means for separating any solvent carried over in the purified gas.

The spent solvent from the drying unit B need not be disposed of by incineration. It is similar to the rich solvent leaving the first aromatic scrubber in that it is a small stream. It may be regenerated by distillation or stripping, and a replacement provided for the column for use whenever severe fouling occurs. Similarly, if the amount of solvent required in the first aromatic scrubber were sufficiently small, it could be disposed of by incineration.

Use of the off-gas from the ligand separation and recovery system for solvent regeneration reduces energy use and minimizes fouling problems caused by polymerization of unsaturated hydrocarbons during regeneration.

We do not intend to be restricted to the above specific examples and illustrations of our invention. It may be otherwise variously practiced within the scope of the following claims.

We claim:

1. Method of preparing a gas mixture for selective removal of ethylene, acetylene or mixtures thereof comprising
   (a) removing water therefrom by washing the gas mixture in a lower alcohol or glycol,
   (b) removing $H_2S$, propylene, and one or more of $CS_2$ and $C_4$ to $C_{10}$ hydrocarbons therefrom by absorption with solvent,
   (c) removing ethylene and acetylene from the contaminated solvent of step (b) by stripping it, at a temperature less than that employed in step (d), with a gas not containing ethylene or acetylene and which will not substantially dissolve in the solvent, and
   (d) removing contaminants from the solvent for reuse of the solvent by stripping it, at a temperature between about $-50°$ and about $400°$ F, with a gas not containing ethylene or acetylene and which will not substantially dissolve in the solvent.

2. Method of claim 1 wherein the gas used for stripping is an off-gas from a complexible ligand separation and recovery system.

3. Method of claim 1 wherein the gas mixture is washed in step (a) with methanol.

4. Method of claim 1 in which step (a) is effected by contacting the gas mixture with the lower alcohol or glycol in two or more sequential countercurrent contacting zones, each succeeding zone containing a higher concentration of alcohol or glycol than the preceding zone.

5. Method of claim 1 in which step (b) is effected by countercurrently contacting the gas with the solvent at temperatures above the solvent freezing point but less than $250°$ F, and pressures between 20 and 100 psia.

6. Method of claim 1 in which the gas mixture is derived from coke oven gas, treated to remove tars and ammonia.

7. Method of claim 1 in which the solvent is selected from the group consisting of toluene, xylene, ethylbenzene, and cumene.

8. Method of removing ethylene, acetylene, carbon monoxide, or mixtures thereof from a gas mixture comprising
   (a) removing water from said gas mixture by washing it with a lower alcohol or glycol,
   (b) removing $H_2S$, propylene, and one or more of $C_2$ and $C_4$–$C_{10}$ hydrocarbons therefrom by absorption with solvent,
   (c) removing ethylene and acetylene from the contaminated solvent of step (b) by stripping it, at a temperature less than that employed in step (d), with a gas not containing ethylene or acetylene and which will not substantially dissolve in the solvent,
   (d) removing contaminants from the solvent for reuse of the solvent by stripping it at a temperature between about $-50°$ F and about $400°$ F with a gas not containing ethylene or acetylene and which will not substantially dissolve in the solvent, and
   (e) contacting the gas mixture from step (b) with a cuprous aluminum halide solution to remove ethylene, acetylene or carbon monoxide therefrom.

9. Method of claim 8 wherein the stripping gas used in step (d) thereof is the off-gas from step (e).

10. Method of claim 8, wherein the gas mixture is washed in step (a) with methanol.

11. Method of claim 8 wherein step (a) includes a plurality of sequential washing substeps.

12. Method of claim 8 wherein step (b) is effected by countercurrently contacting the gas mixture with the solvent at a temperature above the solvent freezing point but less than about $250°$ F.

13. Method of claim 8 in which the gas mixture is derived from coke oven gas treated to remove tars and ammonia.

* * * * *

UNITED STATES PATENT AND TRADEMARK OFFICE
CERTIFICATE OF CORRECTION

PATENT NO. : 4,106,917
DATED : 8/15/78
INVENTOR(S) : Marvin C. Fields, David L. Oliver & Arthur R. Snyder It is certified that error appears in the above-identified patent and that said Letters Patent are hereby corrected as shown below:

Column 2, line 7, change "for" to -- from --.

Column 6, line 62, change "while" to -- which --.

Column 7, lines 3 and 4, change "objectives" to
-- objective -- and after "objective" insert -- is --.

Column 8, line 29, claim 8, change "$C_2$" to -- $CS_2$ --.

Signed and Sealed this

Twentieth Day of February 1979

[SEAL]

Attest:

RUTH C. MASON
Attesting Officer

DONALD W. BANNER
Commissioner of Patents and Trademarks